(12) United States Patent
Brattel

(10) Patent No.: US 7,656,631 B2
(45) Date of Patent: Feb. 2, 2010

(54) ELECTRICAL CIRCUIT PROTECTION ARRANGEMENT

(76) Inventor: Mark Simon Brattel, Lyngarth, Church Lane, Farndon, Cheshire (GB) CH3 6QD (*) Notice: Subject to any disclaimer, the term of this patent is extended or adjusted under 35 U.S.C. 154(b) by 1135 days.

(21) Appl. No.: 10/506,088

(22) PCT Filed: Feb. 25, 2003

(86) PCT No.: PCT/GB03/00806
§ 371 (c)(1), (2), (4) Date: Aug. 27, 2004

(87) PCT Pub. No.: WO03/073798
PCT Pub. Date: Sep. 4, 2003

(65) Prior Publication Data
US 2008/0291594 A1 Nov. 27, 2008

(30) Foreign Application Priority Data
Feb. 27, 2002 (GB) .................. 0204539.1

(51) Int. Cl.
H02H 3/00 (2006.01)
(52) U.S. Cl. .................................................. 361/86
(58) Field of Classification Search .................. 361/86
See application file for complete search history.

(56) References Cited

U.S. PATENT DOCUMENTS

| 4,307,392 A | 12/1981 | Loshbough et al. | |
|---|---|---|---|
| 5,805,401 A * | 9/1998 | Schuellein et al. | 361/92 |
| 6,147,617 A | 11/2000 | Kim | |
| 6,163,180 A * | 12/2000 | Hidaka et al. | 327/112 |
| 6,225,912 B1 | 5/2001 | Tanaka et al. | |

FOREIGN PATENT DOCUMENTS

| EP | 0 073 943 | 3/1983 |
|---|---|---|
| GB | 2088161 A | 6/1982 |
| GB | 2277418 A | 10/1994 |
| GB | 2373934 A | 10/2002 |

OTHER PUBLICATIONS

European Patent Office Examination Report for Application No. 03 704 818.8—2206, Oct. 11, 2005, 4 pages.
PCT International Search Report for International Application No. PCT/GB03/00806, Jun. 17, 2003, 3 pages.
UK Search Report Under Section 17 for Application No. GB 0204539.1, Feb. 10, 2003, 1 page.

* cited by examiner

Primary Examiner—Fritz M. Fleming
Assistant Examiner—Lucy Thomas
(74) Attorney, Agent, or Firm—Reising Ethington P.C

(57) ABSTRACT

An electrical circuit having a load that includes at least one semiconductor junction device supplied with operating current at a voltage sufficient to bias the semiconductor junction device into conduction and control means to provide or inhibit supply of power to said load. A protection arrangement for the electrical circuit includes a sensing circuit that detects characteristics of the load when the operating current is not flowing. The sensing circuit includes threshold comparison circuit that compares the sensed voltage level with at least one stored value representative of a threshold of a load characteristic indicative of a correctly functioning semiconductor junction device. The sensing circuit includes a sensing current generator which in the absence of operating current to the load effects passage through the load of a sensing current having a value that is less, for a semiconductor junction, than the forward conduction threshold thereof.

24 Claims, 1 Drawing Sheet

ELECTRICAL CIRCUIT PROTECTION ARRANGEMENT

Figure 1:
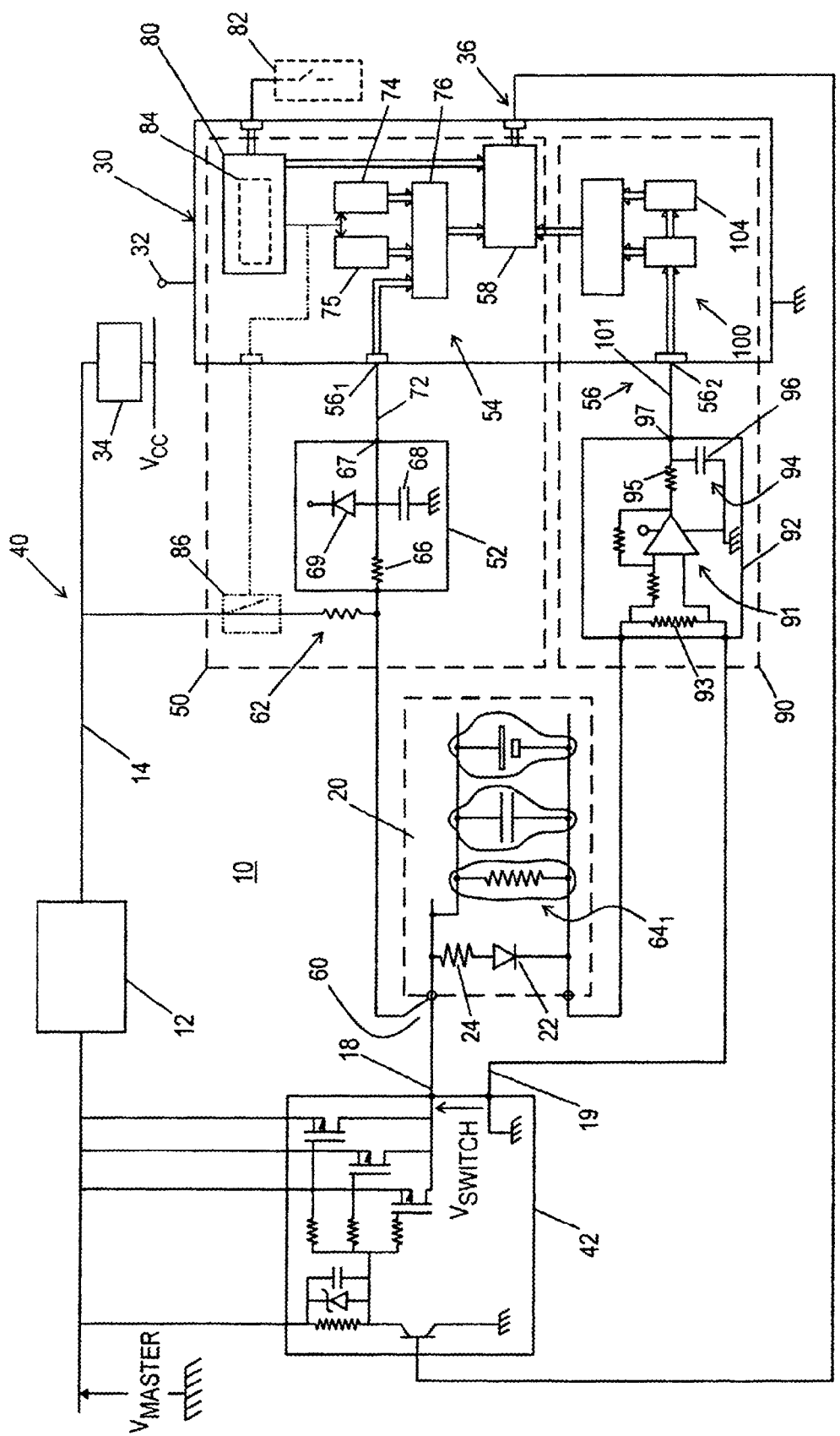

This invention relates to electronic circuits of the type having a load including at least one semiconductor junction device and a power source arranged to supply operating current for the load at an operating voltage sufficient to bias the or each semiconductor junction device into conduction, and in particular relates to circuit protection arrangements for protecting the electronic circuit from load anomalies which may lead to detrimental and/or dangerous conditions.

One form of electronic circuit with which the invention is particularly, but not exclusively, concerned is for an illuminated sign or display wherein a plurality of semiconductor diodes, each capable of emitting optical radiation when forward biased, are coupled in an array.

Such semiconductor diodes are usually referred to as light emitting diodes (LEDs) notwithstanding that the radiation may not be in the visible spectrum.

Such LEDs, in common with other semiconductor junction devices, used as loads exhibit load conduction characteristics which are non-linear in respect of obeying Ohm's law.

In this specification the term "load conduction characteristics" is used to mean the extent to which the load, in passing a current (I) is accompanied by a voltage drop (V) thereacross that is indicative of the I-V characteristics of any devices or components comprising the load.

As is well known in the art, the conduction characteristic of a so-called linear load which obeys Ohm's law is that the voltage across the load is directly proportional to the current passing therethrough, even for small values of current, and the power dissipated therein as heat increases as the product of current and voltage, or alternatively as the square of the current. This may be compared with a single junction semiconductor device, such as an LED, having when forward biased an I-V characteristic in which a small but significant threshold voltage (of the order of 0.5 to 1 V) exists before and for the passage of even very small currents whereas thereafter, significant current levels can pass without a significantly large increase in the voltage drop across the device, that is, it exhibits a non-linear forward conduction characteristic which in part enables such a device to pass large currents and emit radiation whilst generating relatively little internal heat.

Notwithstanding that a semiconductor device is formed from at least one body of conductive material which will exhibit some ohmic resistance when conducting, it is usual to drive such a device from a current limiting source. In practice, where a large number of devices are grouped together to provide intense illumination in a product, for example in providing edge illumination of display panels of plastics materials, the devices may be housed so that ventilation to the surroundings is necessary to accommodate heat produced within the devices and notwithstanding that this may conflict with a desire that the emitted radiation is not directly visible through ventilation apertures and the like.

Thus in practice, the use of large numbers of LEDs forming light sources for display panels and like articles requires the devices to be operated with load current and voltage values within the capacity of the article to dissipate such heat as is generated, and such parameters are often fixed as part of the overall article design.

It will be appreciated that such circuit arrangements are vulnerable both to the generation significant additional heat per se and to the generation and dissipation of even small amounts of additional heat locally in regions where the thermal balance is upset.

In certain circumstances, electrical breakdown of a semiconductor junction within such a diode fed from a current limiting source may result in it effecting an ohmic resistance and, notwithstanding in likely reduction in current flow caused by the resistance, become a source of heat which may effect other components coupled thereto electrically or thermally, spreading component failure or escalating generation of additional heat that may lead to a fire.

The generation of additional heat and resultant component failure and/or fire may also result from failures of non-semiconductor components or of the circuit structure itself, typically due to the formation of unintentional and unregulated conductive paths between conductors of the circuit by break down of insulating materials or ingress of contaminants of an electrically conductive, chemically or electro-chemically reactive nature.

It will be appreciated that that whereas the effects of such contaminant ingress to the load may be a permanent change in its conduction characteristics, the presence of contaminants may affect other characteristics of the load in ways that may not be immediately apparent from how the load handles operating current provided by the source but which, in being inconsistent with the correctly operating semiconductor device load, are nevertheless indicative of a physical state of the load which portends operation from which the circuit requires protection.

For example, loads comprising LEDs may have them connected in linear 'strings' and contained within transparent housings for protection from the environment or apertured thereto for ventilation. If the sealing of any such housing is breached or ventilation apertures badly positioned then it is possible for the housing to fill with rain water or atmospheric moisture. Such water, as a liquid or vapour, may act as a weak electrolyte and in contact with dissimilar metals form a voltaic cell or battery and generate a voltage across the load. Alternatively or additionally, such water may act as a dielectric between conductors and effect a capacitance tending to store any voltage applied to the load.

Whilst neither of these situations necessarily affects operation of the load when supplied with power by the source, they are indicative of such sealing breach and point to the load operating other than as intended and thus do have a bearing in determining the desirability of applying operating power to the load, that is, its protection.

It will be seen that if the circuit is operated for prolonged periods, it is possible for such changes in load characteristics which depend upon the presence of water or other contaminants to occur randomly with any such ingress and possibly disappear with drainage or evaporation, so that it is desirable to identify and act upon changes to the characteristics of the load caused thereby if and when they occur.

It will be appreciated that such LEDs and the application and configuration outlined above represent only one example of a circuit load comprising one or more semiconductor junction devices for which a change in conduction or other characteristics of the circuit may lead to the need for protection of other components and/or the circuit as a whole, and in general any electronic circuit wherein a load contains one or more semiconductor devices which are biased into conduction by current from a power source may benefit from protection against adverse effects caused by changes in characteristics of the load, particularly introducing a current path with an ohmic resistance and thereby an unwanted source of heat.

Preserving the generality of the foregoing it is an object of the present invention to provide an arrangement for, and a method of, protecting an electronic circuit having a circuit power source and a load therefor including at least one semiconductor junction device arranged to be biased into conduction by the source and pass current derived therefrom. It is furthermore an object of the present invention to provide an electronic circuit including such a protection arrangement.

According to a first aspect of the present invention a circuit protection arrangement for an electronic circuit having a circuit power source, operable to supply operating current, for passage through a load including at least one semiconductor junction device, at an operating voltage sufficient to bias the semiconductor junction device into conduction and control means having output port means operable to provide thereat, or inhibit therefrom, an enabling signal for effecting supply of power to said load from the source, comprises a supply switch, responsive to said enabling signal to effect or inhibit supply of power to said load from the source, and off-line load characteristics sensing means (as herein defined), arranged to be coupled to the load where fed with operating power by the supply switch and operable, absent supply of load power to the load from the supply switch, to sense a voltage level across the load, including off-line threshold comparison means operable to compare the sensed voltage level with at least one stored value, the or each stored value being representative of a threshold of a load characteristic delimiting consistency with semiconductor and non-semiconductor behaviour, and responsive to a threshold comparison decision indicative of the load characteristics being inconsistent with those of a correctly functioning semiconductor junction device load, to inhibit provision of the enabling signal at said output port means.

In this specification the term "off-line" is used in relation to the load in respect of its function when operating power is absent from the load and is used in relation to associated circuit components and their function to indicate operation, intended or actual, when the load is off-line. The term "on-line" is used in relation to the load in respect of its function when operating power is applied and is used in relation to associated circuit components and their function to indicate operation, intended or actual, when the load is on-line.

According to a second aspect of the present invention, an electronic circuit comprises a circuit power source, operable to supply operating current for a load including at least one semiconductor junction device at an operating voltage sufficient to bias the semiconductor junction device into conduction, control means having output port means operable to provide thereat, or inhibit therefrom, an enabling signal, supply switch responsive to said enabling signal to effect supply of power to said load from the source, and a circuit protection arrangement as defined in the preceding paragraph.

The off-line load characteristics sensing means may comprise what is referred to hereinafter as "off-line conduction sensing means" coupled to the load where fed by the source and operable to determine, absent supply of operating power to the load from the source, existence of conductive characteristics which are either consistent with a semiconductor junction load not fully biased into forward conduction or inconsistent therewith and consistent with an ohmic resistance. Optionally there may be provided what is referred to hereinafter as "on-line conduction sensing means" which is coupled to the load and operable to determine, during supply of operating power to the load, if the current drawn by the load varies from a stored value by more than a predetermined amount that is indicative of changing conduction characteristics.

Preferably, the off-line conduction sensing means includes a sensing current generator operable, absent supply of power to the load from the supply switch, to effect passage through the load of a sensing current having a value that is less, for a semiconductor junction, than the forward conduction threshold thereof, and to sense the voltage level across the load in response to said sensing current, and the off-line threshold comparison means is operable to determine if the sensed voltage level is below a primary stored value, predetermined as the minimum for said sensing current consistent with a semiconductor junction and maximum for the load having conduction characteristics from which the circuit requires protection from the application of said operating power, and respond to said voltage level being below said primary stored value to provide an unfavourable threshold comparison decision to effect inhibition of said enabling signal.

The sensing current source means may comprise a source resistance connected between the circuit power source and a node connecting the load to the supply switch, preferably having a value in Ohms of (circuit power source voltage–load conduction threshold voltage)Volts/$I_{sense}$, where $I_{sense}$ is in the range 150 to 300 µA. For a circuit having a power source of 48 Volts, the source resistance may have a resistance of 0.22 MOhm. The off-line voltage sensing means may comprise a voltage reading device, connected to said node, such as a reading resistance connected between the output terminal and said node connection and, optionally, a noise filtering capacitance between the output terminal and ground. Although not necessary, the reading resistance may conveniently be of the same order of magnitude as the source resistance.

The control means may include supply gating logic, operable to receive a threshold comparison decision from the off-line threshold comparison means, said supply gating logic being responsive to an unfavourable threshold comparison decision below the stored value to inhibit provision of an enabling signal at said output port means. Said threshold comparison decision may be received by way of input port means from threshold comparison means externally of the control means, or may be derived by off-line threshold comparison means within the control means from at least one sensor voltage level received by way of input port means.

In such latter case, and insofar as the control means comprises or includes logic devices which typically operate from low voltage power sources ($V_{CC}$=5V), the voltage reading device may include voltage clamping means coupled to the output terminal and to the power source of the control means, operable to limit the voltage level at the output terminal applied to the input port means of the control means.

The control means may include permission logic responsive to a controlled desire to supply power to the load to provide a permission signal or command to the supply gating logic, and the supply gating logic be responsive to said permission in conjunction with said threshold comparison decision not being unfavourable to provide said enabling signal to the supply switch.

The load voltage level may be sensed for comparison with the secondary threshold value with or without the passage of sensing current through the load, the control means being arranged to inhibit passage of the sensing current if desired.

The circuit protection arrangement defined in the preceding paragraphs may be made particularly suitable for an electronic circuit in which the load comprises one or more single junction, or two terminal, semiconductor devices which respond to a voltage level of the applied load power to conduct load current, such as light emitting diodes, by causing the permission logic timer to inhibit provision of an enabling signal by the gating logic for a period less than that for which an observer perceives a change in light output of load. His may be usefully achieved by the permission logic timer being operable to inhibit provision of an enabling signal for a period within a range of range 1 μsec to 250 msec, particularly the range of 0.5 msec to 5 msec, and more particularly, approximately 1 msec.

Notwithstanding the type of load device, the permission logic timer may conveniently be operable to inhibit provision of an enabling signal at intervals of the order of 10 seconds, or for longer or shorter intervals. Instead of automatic inhibiting by such permission logic timer, inhibition may be effected randomly and/or by manual intervention The aforementioned on-line conduction sensing means is responsive to the operating current flowing through the load from the supply switch and may include on-line voltage sensing means operable to derive an on-line sensor voltage level, and on-line threshold comparison means operable to determine if the sensed voltage level differs from a stored value, representative of normal operating current passed by the load, by more than a predetermined amount that is indicative of a change in conduction characteristics of the load to cause the supply gating logic to inhibit provision of an enabling signal to the supply switch.

The on-line voltage sensing means may comprise a current-to-voltage converter including a low value resistor in series with the load and the supply switch and a differential amplifier operable to provide an on-line sensor voltage level related to the current passing through the load. The current-to-voltage converter may also include a smoothing circuit operable to average the effect of changes in load current. The on-line threshold comparison means may be provided by the control means, being operable to sample the on-line sensor voltage level periodically and compile from a plurality of successive samples a running average value of the load-current-derived voltage level representing a datum, store said running average as a stored datum value, effect comparison between said samples and said stored datum value and, in response to determination of departure of a sample from the datum value by more than said predetermined amount, to inhibit provision of an enabling signal to the supply switch by the control means. Alternatively, the stored datum value may be a predetermined, fixed or otherwise computed value.

According to a third aspect of the present invention a method of protecting an electronic circuit, having a circuit power source and a load therefor including at least one semiconductor junction device arranged to be biased into conduction by the source and pass load current derived therefrom, comprises intermittently inhibiting supply of power from the source to the load for a predetermined period and, absent said supply of operating power to the load during said period, sensing the voltage level across the load, comparing the sensed voltage level with at least one stored value, each said value predetermined as a threshold of a load characteristic delimiting consistency with a semiconductor junction device, and in response to a threshold comparison decision indicative of load characteristics not inconsistent with a correctly functioning semiconductor device load, at the end of said period enabling supply of power to the load from the source.

The method may comprise, absent said supply of operating power to the load during said predetermined period, passing through the load a sensing current having a value that is less, for a semiconductor junction, than the forward conduction threshold thereof, sensing the voltage level across the load in response to said sensing current, comparing the sensed voltage with at least one primary stored threshold value predetermined as the minimum for said sensing current consistent with a semiconductor junction device load, and maximum for the load having conduction from which the circuit requires protection from the application of said operating power, and in response to a threshold comparison decision indicative a sensed voltage level not below said primary stored value, at the end of said period enabling supply of power to the load from the source.

The method may comprise connecting the load to the circuit power source by way of supply switch, connecting a sensing current generator between the source and a node between the supply switch and the load, sampling the voltage at said node by way of a high impedance reading device and, in response to inhibiting supply of power from the source to the load by said supply switch, comparing the voltage at said node with said stored value. The method may comprise passing a sensing current through the load in the range 100 to 300 μA.

Inhibiting supply of power from the power supply to the load may be effected upon initiation of circuit operation for said period and/or during circuit operation by inhibiting supply of power from the power supply to the load at intervals of the order of 10 seconds. If the electronic circuit has a load thereof including at least one light emitting diode arranged to be biased into conduction by the source and pass current derived therefrom, the method may include inhibiting supply of power from the source to the load for a period less than that required to register a change in light output with an observer, typically for a period in the range 0.5 msec to 5 msec and preferably for approximately 1 msec or less, although a period in the range 1 μsec to 250 msec may be employed.

The method may also comprise determining from instantaneous current flow through the load when biased into full conduction by the source, a voltage level related to the value of current, sampling said voltage level at intervals, producing from said samples a running average representing a long term average value of load current as a datum, comparing each said sample with the datum and in response to a difference exceeding a predetermined amount, inhibiting supply of power from the source to the load.

Embodiments of the invention will now be described by way of example with reference to the accompanying drawing, in which the single FIGURE comprises a block schematic diagram of an electronic circuit having a semiconductor load, a circuit power source for driving the load and a circuit protection arrangement in accordance with the present invention.

Referring to the FIGURE, an electronic circuit 10 has a circuit or master power source 12 arranged to feed a rail 14 at a master voltage $V_{MASTER}$. Source 12 drives, by way of supply and return lines 18 and 19 respectively, a load 20 with operating current $I_{LOAD}$ at an operating voltage substantially equal to $V_{MASTER}$.

The load 20 includes at least one semiconductor junction load device, illustrated schematically at 22, such as an LED connected by way of a current controlling device 24 between the supply and return lines 18 and 19.

In practice the LED device may comprise, instead of the single LED shown, a plurality of LEDs connected in parallel and/or in series without changing the operating principle, that the source provides current at an operating voltage across the or each semiconductor junction device sufficient to bias it into full forward conduction and draw current to the extent permitted by any limiting or regulating device. Once the LED load device is fully conducting the voltage dropped thereacross is substantially invariant even if the current varies.

The circuit 10 also includes control means indicated generally at 30, which operates to effect or inhibit supply of power from the master source 12 to the load. The control means may be provided by discrete or integrated components operating logically upon signal levels or may be provided by one or more microprocessors or a general purpose computer in accordance with a stored program, the precise nature and structure of the control means being secondary to the functions it performs. For the purposes of illustration, it is shown as comprising a plurality of interrelated function blocks and input and output port means described further hereinafter, it being understood that such port means represents interfacing between signals levels derived and utilised by the remainder of the circuit and principally logical processes occurring within the control means.

The control means 30 thus functionally comprises a plurality of elements, collectively being powered by way of supply terminal 32 from low voltage, control means power source 34, connected to the master source 12, at relatively low voltage $V_{CC}$ (typically 5 V).

The control means 30 has output port means 36 and operates to provide thereat, or inhibit therefrom, an enabling signal to effect supply of power from the source 12 to the load by way of lines 18 and 19. Such output port means may comprise any circuit configuration providing an output port, depending upon the structure of the control means.

In accordance with the invention, the circuit is provided with a protection arrangement, indicated generally at 40.

The protection arrangement comprises a supply switch 42 responsive to the enabling signal from outlet port means 36 to couple power from the master source to the load, supplying it to line 18 at a suitable operating voltage $V_{SWITCH}$, which may conveniently be substantially equal to the master source voltage $V_{MASTER}$, or may differ therefrom.

The protection arrangement 40 also comprises off-line load characteristics sensing means, indicated generally at 50, coupled to the load where fed with operating power by the supply switch and operable to sense a voltage across the load that is representative of one or more characteristics of the load, dependant upon the physical and operating status of the load, and compare the sensed voltage level with at least one stored value, the or each stored value being representative of a threshold of a load characteristic delimiting consistency with semiconductor and non-semiconductor behaviour, and responsive to a threshold comparison decision indicative of the load characteristics being inconsistent with those of a correctly functioning semiconductor junction device load, to inhibit provision of the enabling signal at said output port means. The terms "off-line" and "on-line" are used as explained above and in relation to the load not passing or passing, respectively, operating current from the supply means. Insofar as the sensing means 50 is connected to the load, it senses load voltage not only when it is on-line but also, and in accordance with the invention, it senses any voltage across the load when the load is off-line.

Various load characteristics that may be sensed by the sensing means 50 will be described hereinafter but initially it will be considered with respect to conduction characteristics of the load, in particular whether the load exhibits a conduction characteristic which is inconsistent with that expected of a semiconductor device load and in view of which the circuit requires protection from the application of operating power to the load.

Thus insofar as the load characteristic being sensed is its conduction, the sensing means 50 may be considered as load conduction sensing means, comprising voltage sensing means 52, coupled to the load 20 and operable to derive at least one sensor voltage level representative of current passed by the load as described more fully below, and within the control means 30, threshold comparison means 54 operable to compare the sensed load voltage level with a primary stored value and responsive to a difference therebetween, having regard to the current passing through the load, that is indicative of said sensed voltage level representing a load conduction characteristic consistent with or inconsistent with a correctly functioning semiconductor junction device to produce a threshold comparison decision that is favourable or unfavourable. The control means 30 includes input port means 56 to receive at least one sensor voltage level from the voltage sensing means 52, and supply gating logic 58 which is responsive to a threshold comparison decision to inhibit or permit provision of the enabling signal at output port means.

The (off-line) voltage sensing means 52 is coupled to the load where fed with operating power by the supply switch, that is, to line 18 connecting the supply switch 42 to the load, at a tapping point or node 60, and is arranged to effect a representation of the conduction behaviour of the load to current absent supply of normal operating current from the source, that is, with the load taken "off-line" by the control means inhibiting the enabling signal to the supply switch, and during said absence passing through the load a sensing current having a value that is less, for a semiconductor junction, than the forward conduction threshold thereof, and sensing the voltage level across the load in response to said sensing current. The off-line conduction sensing means 50 comprises also a generator of said sensing current 62 in the form of a source resistance connected between the circuit power source 12 and said node 60. The value of the source resistance is chosen having regard to the master source voltage and voltage drop expected across the load to permit a current of about 200 μA to be drawn by the load with the supply switch inhibited, that is, a current insufficient to bias the semiconductor junction or junctions of the load into full conduction. The circuit master source may conveniently drive the load at a voltage $V_{MASTER}$ or $V_{SWITCH}$ of about 48V and the source resistance have a value of about 0.22 MOhm. The source resistor magnitude is nevertheless greater than the typical ohmic resistance observed by breakdown of such semiconductor junction, or indeed any physical short circuit caused by defective or contaminated conductors in the load and indicated schematically at $64_1$.

The off-line voltage sensing means 52 comprises a voltage reading resistor 66 connected between the node 60 and an output terminal 67 and an optional capacitor 68 connected between the output terminal 67 and ground, which serves to decouple from the read node voltage any high frequency electrical disturbances internally or externally of the circuit. The reading resistor has resistance of the same order of magnitude as the source resistor 62.

As the voltage reading device is permanently connected to the line 18 at node 60, when the source is supplying current to the load this line reaches a voltage $V_{SWITCH}$, which may be may tens of volts, and the output terminal 67 will tend to rise to such voltage. To protect connected circuitry, and particularly the control means, the voltage reading means includes clamping means 69 in the form of a diode coupled to the output terminal 67 and to the low voltage source 34 shared with the control means.

The off-line threshold comparison means 54 formed within and by the control means 30, and the output terminal 67 of the off-line voltage sensing means is connected by line 72 to input port $56_1$ of the input port means 56 of the control means, by way of which port a representation of the sensor voltage level (whether as a digitised sample, analogue or logic level signal etc.) is coupled to the off-line threshold sensing means. The threshold comparison means 54 comprises a primary threshold store 74, which is set to store a primary stored value of sensor output voltage predetermined as the minimum for said sensing current consistent with a semiconductor junction and maximum for the load having conduction characteristics, particularly ohmic resistance, from which the circuit requires protection from the application of said operating power, in this embodiment about 0.3 V. The threshold comparison means 54 comprises also a comparator 76 to effect comparison between the threshold represented by the primary stored value and that received at input port 56₁. A favourable, or positive, comparison decision, namely that the sensor voltage level has not fallen below the threshold level provides an input to supply gating logic 58.

The control means also includes permission logic, indicated at 80, which responds to a desire to provide power to the load 20, and represented here by manual switch 82 or a switching control program, by providing a permission approval command to the supply gating logic 58. The supply gating logic is responsive to the permission in combination with a favourable threshold comparison decision to produce said enabling signal at the output port 36 and thus operation of the switch to supply power to the load or, conversely, is responsive to either one of an unfavourable threshold comparison decision or lack of permission to inhibit production of the enabling signal. The permission logic includes a timer, indicated at 84, operable to effect at predetermined intervals removal of the permission from the supply gating logic for a predetermined duration and, as a consequence thereof, force inhibition of the enabling signal to the supply switch.

Considering further the off-line conduction sensing means 50, it will be seen that in the presence of the enabling signal to the supply switch, the load supply line 18 is maintained at operating voltage $V_{SWITCH}$, approximately equal to $V_{MASTER}$. As a consequence thereof the node 60 and at the Junction of source and reading resistors 64 and 66 is maintained at $V_{SWITCH}$ and causes the voltage level at the output 67 to tend towards that value, at least to the maximum level permitted by clamping diode 69, which is applied to the input port 56₁ of the control means, this level of sensor voltage exceeding the primary stored value therein and causing the gating logic 58 to confirm the permission for production of the enabling signals.

Upon timed removal of the permission, and for the duration of the removal, the source 12 is effectively disconnected from empowering the load by way of the supply switch 42 and the sensing current source resistor 62 is effectively in series with the load device, forming a potential divider at their junction node to which the reading resistor 66 connected. The source and reading resistors are of sufficiently high impedance that the current drawn by the load is substantially at or below the level at which any semiconductor device of the load is fully biased into conduction such that the voltage drop across the load is about the conduction threshold and in excess of the primary stored value such that comparison therewith results in a favourable decision. At the end of the period, when permission is restored to the supply gating logic, the favourable threshold comparison decision permits the source to be again enabled by way of the switch and the load empowered by raising the line 18, raising sensor voltage level at output 67 to its clamped level, and the load is driven until the next timed permission interruption.

If, however, when permission removal disconnects the switching supply means from the load, the sensing current source resistor forms a potential divider with a load that comprises a linear ohmic resistance capable of generating significant heat when fully empowered then the current drawn through the source resistor and the voltage thereacross may be expected to increase, such that voltage across the load and sensed at node 60 is less than for a semi-conductor device. Thus if the sensor voltage level applied to the off-line threshold comparison means is below the threshold of the primary stored value, the threshold comparison means effects an unfavourable threshold comparison decision and sets the supply gating logic so as to cause it to continue inhibition of the enabling signal upon restoration of the permission at the end of the period, thereby effectively removing power from the load to prevent damage to the circuit.

Such condition may result in other activities within, or initiated by, the control means and/or issuing of an alert. Such an alert may be particularly useful in circuits where such changes in the load do not present a threat to safety or the like.

As a modification of, or as an alternative to, such timed interruptions of the power supply to the load, the permission logic may operate to effect a delay in applying permission to the supply gating logic when operation is initiated, during said delay period cause the sensing current to pass through the load and the sensor voltage level to be compared with the primary stored value, and thereafter permit an enabling signal to empower the source to drive the load only if the threshold comparison decision indicates that the off-line sensor voltage level has not been put to a reduced state by an uncharacteristically low resistive load during the delay period. Such initiation delay may conveniently be effected by timer 84 or the like which enters a permission removal period on start-up and prior to giving a permission signal or command to the supply gating logic that can enable the supply switch.

Confining such off-line conduction sensing to a pre-operation delay avoids any discontinuity that may result from interrupting the supply of power to the load during operation, for instance where, as here, the load is a visual display of one or more LEDs. However, it also is often the case that such loads are in operation for such long periods that conduction sensing only at start-up may be inadequate.

Although off-line sensing of the load impedance requires, by definition, supply of operating power to be removed from the load, complex, additional load switching between the source and current measuring circuitry, and any time delays inherent therewith, is avoided by the arrangement described above which permits, and it is within the aim of this invention to effect, the intermittent removal of operating power from the load for a period that is shorter than the persistence of vision of the human eye such that an observer of the sign or display illuminated by the load LEDs is not consciously aware of the interruption and restoration of power supply to the load.

It has been found that interruption having a duration of 5 msec or less is suitable to avoid the visual effects of circuit interruption and for the off-line conduction sensing means to adjust to sensing a reduced voltage, and the control means in this embodiment is arranged such that the timer effects inhibition of the enabling signal for a period of 0.5 to 5 msec, preferably 1 msec or less. However, more generally useful results may be expected from interruption duration in the range 1 μsec to 250 msec Off-line load conduction sensing as described above is predicated on the fact that when power from the supply switch is removed, the voltage across the load falls rapidly to the level determined by the sensing current source and the effective resistance to such current offered by the load. It is also a feature of the invention that such removal is constrained to a relatively short period of time. If, as discussed above, the physical load structure is contaminated with a poorly conductive material that effects a storage capacitance at any time during circuit operation, when the relatively high power supply voltage $V_{SWITCH}$ is removed, the capacitance will have the effect of causing the voltage across the load to decay relatively slowly, notwithstanding sensing current source resistor 62.

Because power supply removal is for a relatively short duration, even a modest value of capacitance may affect the voltage across the load truly reflecting the load response to the sensing current.

The conduction sensing means described above, 50, may be adapted to sense also if the load develops such capacitive characteristics by including within the threshold comparison means 54 a secondary threshold store 75 which is set to store a secondary value of sensor voltage level predetermined as a maximum voltage level expected at the end of the supply removal period from a purely semiconductor or resistive load. Thus, before the end of the removal period the sensed voltage level is compared with both the primary and secondary stored values; if it is less than the primary stored value or greater than the secondary stored value then an unfavourable threshold comparison decision is made and passed to the supply gating means such that at the end of the removal period the supply of operating power to the load remains inhibited. Looked at another way, only if the sensed voltage level is between the primary and secondary stored values, and thus indicative of a semiconductor device load, is the supply of power to the load enabled at the end of the removal period.

It will be appreciated that instead of comparing the actual load voltage decay during the supply removal period with a predetermined threshold value of decay for the same time period the threshold comparison means may determine from voltage levels sensed during the removal period a rate of decay of the load voltage upon removal of the supply and the comparison means may effect threshold comparison with a secondary stored value representing a minimum rate expected during the removal period from a purely semiconductor or resistive load, the threshold comparison means being responsive to a sensed load voltage decay rate less than the secondary stored value to provide to the supply gating logic an unfavourable threshold comparison decision.

Whereas the conduction characteristics of the load may be conveniently and accurately determined upon circuit operation initiation by having a delay period before operating power is supplied to the load it is not, of course, possible to determine how supply voltage decays for the load prior to its application. However, insofar as the applied sensing current may charge an erstwhile discharged capacitance, the sensed voltage level at the end of a short delay period may be less than the primary stored value and be inconsistent with a semiconductor device load and produce an unfavourable threshold comparison decision even with no resistive component to the load.

It will be appreciated that although the characteristic of load capacitance may be determined by the same sensing means and at the same time as the determination of conduction as described above, because the load voltage behaves differently in the short period after supply removal, the sensing of a capacitance characteristic may be performed independently of sensing conduction. The conduction sensing means 50 may be modified such that the permission logic timer 84 addresses the primary and secondary threshold stores 74 and 75 in different supply removal periods, and, if desired, the permission logic timer may also control switch 86 or the like to inhibit the sensing current generator 62 during a supply removal period when voltage decay is examined. The means 54 may also be adapted to sense such capacitance characteristics only, and thus no longer comprise conduction sensing means, by omission of the sensing current generator and primary threshold store 74, although a circuit initiation delay has no utility.

It will be understood that, as described above, contamination of the load may result in the generation of a voltage across it. Whereas such a load characteristic is expected to be masked by the supply voltage $V_{SWITCH}$, it may also be masked by capacitance or sensing current effects during the relatively short supply removal periods foreseen for operation. However, prior to operation of the circuit and subjecting the load to power supply and/or sensing current, the existence of a voltage across the load is indicative of such voltage generation characteristic and thus the presence of contaminants. The off-line load characteristics sensing means may thus be configured to sense such characteristic voltage by causing the permission logic to respond to circuit initiation to effect a delay in applying permission to the supply gating logic and, if appropriate, inhibit passage of sensing current through the load by way of switch 86 or the like; the threshold comparison means compares any load voltage level sensed with a low, possibly zero, threshold value to provide, if such voltage exists, an unfavourable threshold comparison decision to the supply gating means. Such a test for load generated voltage may precede any other test effected during an initiation delay, or alternatively, be employed as a sole test of load generation characteristics. The sensing of such load generated voltage may be done by other than the means 52 and threshold comparison means 54 and accommodate a voltage of either polarity.

It will be appreciated that the power supply to the load may be interrupted and off-line sensing of the load characteristics effected at any convenient time or times that are long relative to the duration or period of interruption. In this embodiment the interruption is effected by the timer inhibiting permission at intervals of approximately 10 seconds, although the interval may be reduced if the circuit and/or load parameters are such that early detection of a load fault are paramount.

Insofar as several load characteristics other than an inappropriate conduction are likely to have long term rather than immediate consequences, the need to effect more frequent off-line measurements of the load characteristics may be mitigated by sensing of conduction characteristics as a function of current passed by the load in the intervals when the load is not off-line.

On-line conduction sensing means 90 functions when the load is passing current in operation. It comprises on-line voltage sensing means 92 in the form of a current-to-voltage converter including low value resistor 93, connected in series with the load in line 19 (or optionally line 18) and across which a small voltage is developed proportional to the load current, a differential amplifier 91 which derives an output voltage related to that formed across the resistor 93, and an optional smoothing or noise rejecting filter circuit 94, formed by resistor 95 and capacitor 96, which provides at output terminal 97 a sensor voltage level which represents the load current. In normal operation of circuit 10 the load current should be substantially constant, subject to any changes thereto required to effect a particular condition, such as a visual effect, although it might be expected to dip and recover during and after controlled interruptions for off-line conduction sensing. However, as such interruptions occur for only a short period in each interruption cycle, for part of the time leading up to such interruption the sensing means gives a good approximation of the average load current. To determine a change in load current that is indicative of incorrect operation, the on-line sensor voltage level at 97 is made available to on-line threshold comparison means 100 formed within and by the control means 30, by way of line 101 and input port 56₂ where it is sampled. The samples are (if necessary) converted to digital form and the values of a predetermined number of successive samples are accumulated in a datum store 104 to provide a value representative of a long term running average of the on-line sensed voltage, and thus of load current value.

The value of each sample taken at input port $56_2$ is compared with the datum value and if it departs therefrom by more than a predetermined amount, which may be positive or negative, that is indicative of an abnormal and potentially damaging change in load current, the on-line threshold comparison means is arranged to inhibit power of the enabling signal at the output port 36. It may inhibit the provision of an enabling signal by way of the supply gating logic 58 associated with the off-line conduction sensing means, but insofar as the on-line conduction sensing means functions substantially continuously, and in any event off-line conduction sensing means and its control elements, the comparison logic associated with the on-line conduction sensing means may override the timing associated with the off-line threshold comparison means and directly inhibit provision of an enabling signal.

It will be appreciated that the averaging and comparison logic of the on-line threshold comparison means may be replaced by simple comparison logic which effects comparison between the sampled on-line sensor voltage and a predetermined or otherwise computed datum, in the manner of threshold store and comparator 74 and 76, and, if desired the filter 94 may have a significant time constant and provide in analogue form an on-line sensor voltage level provided at output 97 may be considered suitable for direct comparison with such a predetermined threshold level.

It will be appreciated that variations may be made as necessary without significantly affecting function, the various functions components and combinations identified herein as means are not intended to be limited to the precise forms illustrated in the FIGURE, and that functional equivalents thereto having constructions within the knowledge of those skilled in the art are intended to be included. For example, although in the described embodiment both off-line threshold comparison means and on-line threshold comparison means are defined within the control means and readily implemented as digital functions, they may be implemented remotely of the control means in digital or analog form, possibly with their associated voltage sensing means, providing to the control means threshold comparison "decisions" rather than the analog voltage levels of the specific embodiment.

It is re-iterated that the control means is illustrated in schematic form only for the purpose of describing the invention and its operation, and insofar as the logical functions are straightforward, it is not necessary to provide details of such instructions to provide the functions, or their equivalents described above, and that as mentioned above, the functions within the control means may be provided by general purpose computing means performing the logic functions by way of software or firmware instructions.

It is also re-iterated that the circuit protection arrangement is not limited to electronic circuits wherein LEDs provide all or some of the load.

The invention claimed is:

1. A circuit protection arrangement for an electronic circuit having a circuit power source, operable to supply operating current, for passage through a load including at least one semiconductor junction device, at an operating voltage sufficient to bias the semiconductor junction device into conduction and control means having output port means operable to provide thereat, or inhibit therefrom, an enabling signal for effecting supply of power to said load from the source, the protection arrangement comprising:

a supply switch, responsive to said enabling signal to effect or inhibit supply of power to said load from the source, and off-line load characteristics sensing means, arranged to be coupled to the load where fed with operating power by the supply switch and operable, absent supply of load power to the load from the supply switch, to sense a voltage level across the load, including off-line threshold comparison means operable to compare the sensed voltage level with at least one stored value, the or each stored value being representative of a threshold of a load characteristic that is indicative of a correctly functioning semiconductor junction device, and responsive to a threshold comparison decision indicative of the load characteristics being inconsistent with those of a correctly functioning semiconductor junction device load, to inhibit provision of the enabling signal at said output port means;

wherein the off-line load characteristics sensing means comprises off-line load conduction sensing means including a sensing current generator and is operable, absent supply of power to the load from the supply switch, to effect passage through the load of a sensing current having a value that is less, for a semiconductor junction, than the forward conduction threshold thereof, and to sense the voltage level across the load in response to said sensing current, and the off-line threshold comparison means is operable to determine if the sensed voltage level is below a primary stored value, predetermined as the minimum for said sensing current consistent with a semiconductor junction and maximum for the load having conduction characteristics from which the circuit requires protection from the application of said operating power, and respond to said voltage level being below said primary stored value to provide an unfavorable threshold comparison decision to effect inhibition of said enabling signal.

2. A circuit protection arrangement as claimed in claim 1 in which the off-line conduction sensing means comprises a source resistance connected between the circuit power source and a node connecting the load to the supply switch and, connected to said node, voltage sensing means operable to provide to an output terminal an off-line sensor voltage level related to the voltage at said node.

3. A circuit protection arrangement as claimed in claim 1 further comprising supply gating logic within the control means, operable to receive a threshold comparison decision from the off-line threshold comparison means, said supply gating logic being responsive to an unfavorable threshold comparison to inhibit provision of an enabling signal at said output port means.

4. A circuit protection arrangement as claimed in claim 3 further comprising within the control means permission logic responsive to a controlled desire to supply power to the load to provide a permission signal or command to the supply gating logic, and the supply gating logic is responsive to said permission in conjunction with said threshold comparison decision not being unfavorable to provide said enabling signal to the supply switch.

5. A circuit protection arrangement as claimed in claim 4 in which the permission logic is responsive to circuit operation initiation to effect a delay in applying said permission to the supply gating logic, after said delay, the supply gating logic being responsive to both permission and a threshold comparison decision based on an off-line sensor voltage level to determine provision or inhibition of said enabling signal for the supply switch.

6. A circuit protection arrangement as claimed in claim 5 in which the control means is arranged to inhibit passage of current through the load during said delay and the threshold comparison means is operable to determine existence of an off-line sensor voltage level, indicative of an electro-chemical voltage generator in the load, to provide an unfavorable threshold decision to the supply gating logic.

7. A circuit protection arrangement as claimed in claim 4 in which the permission logic contains a timer operable to effect at predetermined intervals, and at each interval for a predetermined duration, removal of the permission from the supply gating logic and as a consequence thereof inhibition of an enabling signal to the supply switch, said supply gating logic being operable, during each said removal period, to receive the threshold comparison decision based on at least one off-line sensor voltage level and, after said duration, being responsive to both permission and threshold comparison decision to determine provision or inhibition of said enabling signal for the supply switch.

8. A circuit protection arrangement as claimed in claim 7 in which the permission logic is responsive to circuit operation initiation to cause said timer to effect said delay in applying said permission to the supply gating logic as a first intermittent removal therefrom.

9. A circuit protection arrangement as claimed in claim 8 in which the off-line threshold comparison means is operable to store a secondary stored value representative of a maximum voltage level expected at the end of the removal period from a purely semiconductor or resistive load, and responsive to a received sensed voltage level at the end of the removal period being greater than said secondary stored value to provide to the supply gating logic an unfavorable threshold comparison.

10. A circuit protection arrangement as claimed in claim 8 in which the off-line threshold comparison means is operable to store a secondary stored value representative of a minimum rate of supply switch voltage decay expected during the removal period from a purely semiconductor or resistive load, and responsive to a sensed voltage level decay rate being less than said secondary stored value to provide to the supply gating logic an unfavorable threshold comparison.

11. A circuit protection arrangement as claimed in claim 7 in which the load comprises one or more light emitting diodes, in which arrangement the permission logic timer is operable to inhibit provision of an enabling signal by the gating logic for a period less than that for which an observer perceives a change in light output of the load.

12. A circuit protection arrangement as claimed in claim 7 in which the permission logic timer is operable to inhibit provision of an enabling signal at intervals of the order of 10 seconds.

13. A circuit protection arrangement as claimed in claim 1 further including on-line conduction sensing means responsive to the operating current flowing through the load from the supply switch to derive an on-line sensor voltage level, and the threshold comparison means comprises on-line threshold comparison means operable to determine if the sensed voltage level differs from a stored value, representative of normal operating current passed by the load, by more than a predetermined amount that is indicative of a change in conduction characteristics of the to cause the supply gating logic to inhibit provision of an enabling signal to the supply switch.

14. A circuit protection arrangement as claimed in claim 13 in which the on-line conduction sensing means comprises a current-to-voltage converter including a low value resistor in series with the load and the supply switch and differential amplifier operable to provide an on-line sensor voltage level related to the current passing through the load.

15. A circuit protection arrangement as claimed in claim 13 in which the control means includes said on-line threshold comparison means, being operable to sample the on-line sensor voltage level periodically and compile from a plurality of successive samples a running average value of the load-current-derived voltage level representing a datum, store said running average as a stored datum value, effect comparison between said samples and said stored datum value and, in response to determination of departure of a sample from the datum value by more than said predetermined amount, to inhibit provision of an enabling signal to the supply switch by the control means.

16. An electronic circuit comprising a circuit power source operable to supply operating current for a load including at least one semiconductor junction device at an operating voltage sufficient to bias the semiconductor junction device into conduction, control means having output port means operable to provide thereat, or inhibit therefrom, an enabling signal, and a circuit protection arrangement as claimed in claim 1.

17. An electronic circuit as claimed in claim 16 wherein the load comprises at least one light emitting diode.

18. A method of protecting an electronic circuit having a circuit power source and a load therefor including at least one semiconductor junction device arranged to be biased into conduction by the source and pass load current derived therefrom, the method comprising intermittently inhibiting supply of power from the source to the load for a predetermined period and, absent said supply of operating power to the load during said period, sensing the voltage level across the load, comparing the sensed voltage level with at least one stored value, each said stored value predetermined as a threshold of a load characteristic that is indicative of a correctly functioning semiconductor junction device, and in response to a threshold comparison decision indicative of load characteristics not inconsistent with a correctly functioning semiconductor device load, at the end of said period enabling supply of power to the load from the source;

wherein the method is further characterized by:
when operating power is not supplied to the load during said predetermined period, passing through the load a sensing current having a value that is less, for a semiconductor junction, than the forward conduction threshold thereof, sensing the voltage level across the load in response to said sensing current, comparing the sensed voltage with at least one primary stored threshold value predetermined as the minimum for said sensing current consistent with a semiconductor junction device load, and maximum for the load having conduction from which the circuit requires protection from the application of said operating power, and in response to a threshold comparison decision indicative a sensed voltage level not below said primary stored value, at the end of said period enabling supply of power to the load from the source.

19. A method as claimed in claim 18 comprising connecting the load to the circuit power source by way of supply switch, connecting a sensing current generator between the source and a node between the supply switch and the load, sensing the voltage at said node by way of a high impedance reading device and, in response to inhibiting supply of power from the source to the load by said supply switch, comparing the sensed voltage at said node with said primary stored value.

20. A method as claimed in claim 18 comprising determining if the sensed voltage level across the load decays during said predetermined period consistent with the load having a storage capacitance and in response to a positive determination consistent with the load having a storage capacitance, at the end of said period inhibiting supply of power to the load from the source.

21. A method as claimed in claim 18 comprising inhibiting supply of power from the power supply to the load upon initiation of circuit operation for a delay period and during said delay period sensing the load voltage level, deriving a threshold comparison decision from said sensed voltage level and at least one said stored threshold level and, at the end of said delay period enabling or inhibiting supply of power to the load from the source in accordance with the threshold comparison decision.

22. A method as claimed in claim 18 comprising inhibiting supply of power from the power supply to the load at intervals of the order of 10 seconds.

23. A method of protecting an electronic circuit having a circuit power source and a load thereof including at least one light emitting diode arranged to be biased into conduction by the source and pass current derived therefrom, the method being as claimed in claim 18 and including inhibiting supply of power from the source to the load for a period less than that required to register a change in light output with an observer.

24. A method as claimed in claim 18 comprising determining from operating current flow through the load, a voltage level related to the value of current, sampling said voltage level at intervals, producing from said samples a running average representing a long term average value of load current as a datum, comparing each said sample with the datum and in response to a difference exceeding a predetermined amount, inhibiting supply of power from the source to the load.

* * * * *